United States Patent
Yang (10) Patent No.: US 12,429,978 B1
(45) Date of Patent: Sep. 30, 2025

(54) FINGERNAIL DETECTION AT HAPTIC TOUCHPAD BUTTONS

(71) Applicant: Lenovo (Singapore) Pte. Ltd., Singapore (SG)

(72) Inventor: XinMei Yang, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/821,944

(22) Filed: Aug. 30, 2024

(51) Int. Cl.
G06F 3/041 (2006.01)
G06F 3/01 (2006.01)
G06F 3/0354 (2013.01)
G06F 3/044 (2006.01)

(52) U.S. Cl.
CPC .... G06F 3/041661 (2019.05); G06F 3/03547 (2013.01); G06F 3/044 (2013.01); G06F 3/016 (2013.01); G06F 2203/04105 (2013.01)

(58) Field of Classification Search
CPC .......... G06F 3/041661; G06F 3/03547; G06F 3/044; G06F 3/016; G06F 2203/04105
See application file for complete search history.

(56) References Cited

U.S. PATENT DOCUMENTS

| | | | |
|---|---|---|---|
| 2015/0054780 A1* | 2/2015 | Manba | G06F 3/04186 345/174 |
| 2015/0116205 A1* | 4/2015 | Westerman | G06F 3/04847 345/156 |
| 2019/0018539 A1* | 1/2019 | Zhong | G06F 3/04166 |
| 2021/0064157 A1* | 3/2021 | Matsubara | G06F 3/041 |
| 2021/0333923 A1* | 10/2021 | Matsubara | G06F 1/169 |

* cited by examiner

*Primary Examiner* — Hong Zhou
(74) *Attorney, Agent, or Firm* — Osha Bergman Watanabe & Burton LLP (57) ABSTRACT

A method for detecting a click on a touchpad. The method includes obtaining a baseline sensitivity touch signal from a touch sensor of the touchpad, measuring a first amplitude of the baseline sensitivity touch signal, comparing the first amplitude to a first amplitude threshold, and activating a high-sensitivity mode in response to the first amplitude being lower than the first amplitude threshold. In the high-sensitivity mode, the method includes obtaining a high-sensitivity touch signal from the touch sensor, measuring a second amplitude of the high-sensitivity touch signal, and comparing the second amplitude to a second amplitude threshold. In response to the second amplitude being greater than the second amplitude threshold, the method includes obtaining a force signal from a force sensor of the touchpad, comparing the force signal to a force threshold, and detecting the click in response to the force signal being greater than the force threshold.

14 Claims, 4 Drawing Sheets

FINGERNAIL DETECTION AT HAPTIC TOUCHPAD BUTTONS

BACKGROUND

A computer often includes physical buttons that allow for a user to transmit a signal to the computer, for example, indicating a selection, by clicking a button. However, some modern computers have replaced physical buttons with touchpads or touch screens that altogether lack physical buttons but nonetheless may be used to detect a click or a selection made by a user. For computers that use physical buttons, detecting a click solely requires determining whether a button is pressed or not. By contrast, most modern touchpads and touchscreens identify touch signals by measuring electrical signals with a touch sensor, for example, a change in an electrostatic field maintained by the touchpad. In some instances, the touch signal may not be detected because the touch signal is too weak. An example of such a scenario may include attempting to detect a click on a touchpad from a user that used their fingernail to interact with a touchpad that measures a change in capacitance. Having low electrical conductivity, the user's fingernail may not substantially change the electrostatic field maintained by the touchpad. By contrast, a physical button may be easily pressed using any part of a user's finger. Accordingly, there exists a need to improve the detection sensitivity of clicks from touchpads to successfully operate in low-signal regimes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments related to a method for detecting a click on a touchpad. The method includes obtaining a baseline sensitivity touch signal from a touch sensor disposed within a haptic button zone of the touchpad and measuring a first amplitude of the baseline sensitivity touch signal. The method further includes comparing the first amplitude to a first amplitude threshold and activating a high-sensitivity mode of the touchpad in response to the first amplitude being lower than the first amplitude threshold. Upon activating the high-sensitivity mode, the method yet further includes obtaining a high-sensitivity touch signal from the touch sensor, measuring a second amplitude of the high-sensitivity touch signal, and comparing the second amplitude to a second amplitude threshold. In response to the second amplitude being greater than the second amplitude threshold, the method additionally includes obtaining a force signal from a force sensor disposed within the haptic button zone, comparing the force signal to a force threshold, and detecting the click from the touchpad in response to the force signal being greater than the force threshold.

In general, in one aspect, embodiments relate to a touchpad system. The touchpad system includes a touchpad including a haptic button zone. A touch sensor is disposed within the haptic button zone, and a force sensor is also disposed within the haptic button zone. The touchpad system further includes a touch controller in electrical communication with the touchpad. The touch controller is configured to obtain a baseline sensitivity touch signal from the touch sensor and measure a first amplitude of the baseline sensitivity touch signal. The touch controller is further configured to compare the first amplitude to a first amplitude threshold and activate a high-sensitivity mode of the touchpad in response to the first amplitude being lower than the first amplitude threshold. Upon activating the high-sensitivity mode, the touch controller is yet further configured to obtain a high-sensitivity touch signal from the touch sensor, measure a second amplitude of the high-sensitivity touch signal and compare the second amplitude to a second amplitude threshold. In response to the second amplitude being greater than the second amplitude threshold, the touch controller is additionally configured to obtain a force signal from the force sensor, compare the force signal to a force threshold, and detect a click from the touchpad in response to the force signal being greater than the force threshold.

DETAILED DESCRIPTION

Specific embodiments of the present disclosure will now be described in detail below with reference to the accompanying drawings. Like elements in the various figures are denoted by like reference numerals for consistency.

In the following detailed description of embodiments of the disclosure, numerous specific details are set forth to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (e.g., any noun in the application). The use of ordinal numbers is not intended to imply or create a particular ordering of the elements nor to limit any element to being only a single element unless expressly disclosed, such as using the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

Embodiments disclosed herein generally relate to a touchpad system that can accurately and quickly (e.g., in real time) detect a click of a user, even when the signal from the user to the touchpad is low. Conventionally, a touchpad consists of a touch sensor that outputs a touch signal, and the touch signal is evaluated to determine the presence and location of a touch. For example, many modern touch signals measure a change in an electrostatic field maintained by the trackpad (e.g., through a change in resistance, or a change in capacitance), at least in part, to detect a click from a user. For touchpads utilizing resistive touch sensors, or mechanical button/switch, the point of contact with the touchpad need not be electrically conductive, enabling the use of nonconductive objects for interacting with the touchpad, such as a stylus. However, capacitance sensors often require at least a minimum level of electrical conductivity in order to detect a change in capacitance. If a user attempts to click on a touchpad that uses a capacitive touch sensor with a portion of their finger or other apparatus (e.g., a stylus) that does not have sufficient electrical conductivity, the click may not be detected. One possible option to overcome this shortcoming is to utilize a low threshold in the change in the electrostatic field that is required to detect a click. Such a method alone may result in spurious detections or unintentional clicks from the user. By contrast, embodiments of the present disclosure may be used to operate a touchpad in a high-sensitivity mode to detect weak touch signals while also avoiding spurious detections by requiring a force signal, measured by a force sensor included in the touchpad, to also exceed a force threshold.

Figure 1:
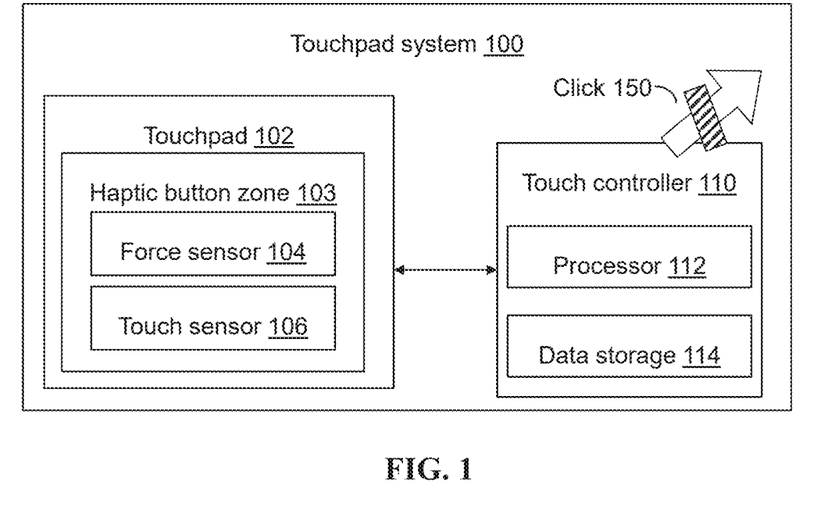
FIG. 1 depicts a touchpad system in accordance with one or more embodiments of the disclosure.
Figure 2:
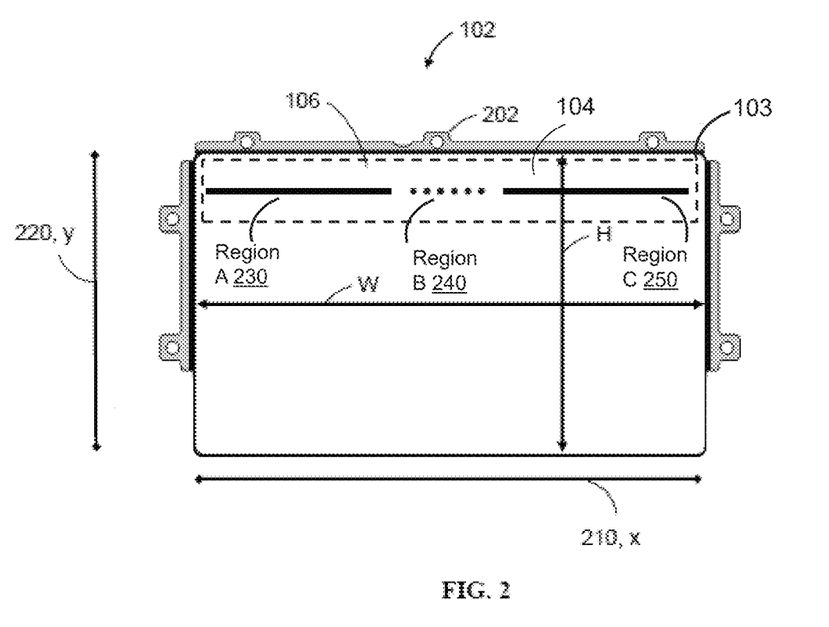
FIG. 2 depicts a touchpad in accordance with one or more embodiments of the disclosure.

FIG. 1 depicts a touchpad system (100) in accordance with one or more embodiments. The touchpad system (100) includes a touchpad (102) and a touch controller (110). The touchpad (102) is used to detect a touch, or contact, of a user. An example of the touchpad (102) consistent with one or more embodiments is shown in FIG. 2. The touchpad includes a specialized region for detecting signals from a user referred to as haptic button zone (103). The haptic button zone (103) may include components for haptic feedback that, for example, simulate the sensation of a button when a user applies force thereto. The haptic button zone (103) includes an area of the touchpad (102) that is smaller than the total area of the touchpad. The haptic button zone (103) also includes a surface with touch sensitivity referred to as a touch sensor (106) or tactile surface. Accordingly, the touch sensor (106) is disposed within the haptic button zone (103). Areas of the touchpad (102) outside of the haptic button zone (103) may also be characterized by touch sensitivity and include additional touch sensors not shown.

The touchpad (102) includes a mounting bracket (202). As depicted, the mounting bracket (202) can extend from the periphery of the touchpad (or, the touch sensor), either partially or totally, and possess one or more through-holes. The one or more through-holes can be used to align and/or attach the mounting bracket (202) with another system or device such as a computer system. Thus, the touchpad (102) can be integrated, both mechanically and electronically, with other systems or be considered a component of a larger system such as a computer system.

The touchpad (102) is characterized by a width (W) and a height (H). The width (W) and the height (H) can reference a width and height of the touch sensor (106). Together, the width (W) and height (H) of the touchpad (102) can be used to reference a point on the touch sensor (106). The width (W) and height (H) of the touchpad (102) need not span an area of the touchpad (102) that includes the mounting bracket (202). The haptic button zone (103) spans a width substantially similar to the total width (W) of the touchpad, while the height of the haptic button zone (103) is smaller than the total height of the touchpad.

A location on the touchpad (102), or, more specifically the touch sensor (106), can be referenced using a first reference axis (210) and a second reference axis (220). For example, the first reference axis (210) can be an x-axis and the second reference axis (220) can be a y-axis arranged such that a location on the touch sensor (106) is specified using an x-coordinate and a y-coordinate (x-y coordinates). The x-coordinate and y-coordinate can specify a location within the area spanned by the width (W) and height (H) of the touchpad (102) by defining the domain of the x-axis to be [0, W] and the range of the y-axis to be [0, H]. A first lateral edge of the haptic button zone (103) is located at approximately x=0, while a second lateral edge of the haptic button zone is located at approximately x=W. A top edge of the haptic button zone (103) is located at approximately y=H, while a bottom edge of the haptic button zone is located at y<H.

Various types of touch sensors (106) can be used with the touchpad system (100), and specifically within the haptic button zone (103), without departing from the scope of this disclosure. For example, the touch sensor (106) can be a resistive sensor, a capacitive sensor, an optical sensor, or the like.

Whether the touch sensor (106) is a resistive touch sensor, a capacitance touch sensor, or other type of touch sensor, the touch sensor (106) generates a touch signal that can be used to determine both the presence and location of a touch on the touchpad (102).

Continuing with FIG. 1, the touchpad (102) further includes at least one of force sensor (104) disposed within the haptic button zone (103). A force sensor need not directly measure a force, but can be configured to measure a related quantity such as strain or pressure. For example, a force sensor can contain a strain gauge bonded to a structure (e.g., metal structure) with a known cross-sectional area and modulus of elasticity to determine a force applied at the force sensor based on a relative elongation or displacement of the structure and strain gauge. The force sensor (104) is configured to produce a continuous-valued output indicative of a force applied proximate the respective force sensor. The force sensor (104) may be disposed anywhere within the haptic button zone.

The touch controller (110) of the touchpad system (100) will now be described. The touch controller (110) includes one or more computer processors (112) and data storage (114) such as one or more of a non-persistent storage (e.g., volatile memory, such as random access memory (RAM), cache memory) and a persistent storage (e.g., a hard disk, an optical drive such as a compact disk (CD) drive or digital versatile disk (DVD) drive, a flash memory, etc.). The persistent storage may also be described as a non-transitory computer-readable medium. Commands, or computer-executable instructions, that are executed by the processor (112) may be included in the data storage (114). The processor (112) may be part or all of an integrated circuit for processing instructions. For example, the processor (112) may be, or include one or more cores or micro-cores. The touch controller (110) further includes a communication interface (not depicted), which may include an integrated circuit for connecting to a network (not shown) (e.g., a local area network (LAN), a wide area network (WAN) such as the Internet, mobile network, or any other type of network) and/or to another device, such as a computer system.

In accordance with one or more embodiments, the touch controller (110) receives a touch signal and force signal from the touchpad (102) using the touch sensor (106) and plurality of force sensors (104), respectively. The touch controller (110) processes the touch signal and the force signal to detect a click (150) from a user, where the click (150) can represent a signal transmitted from the user using the touchpad (102). FIG. 1 depicts the transmission of the detected click (150) to another system such as a computer system where the computer system can be external to the touchpad system (100) or include the touchpad system (100).

In some embodiments, the touchpad system (100) is used with a computer system, for example, as an input device of the computer system. The touchpad system (100) can be associated with a computer system by inclusion in the computer system or in electrical communication with the computer system. Thus, a click (150) or plurality of clicks (150) can be transformed to a command of the computer system. For example, the command can indicate of a selection by the user acting on the computer system.

The haptic button zone (103) may also include a plurality of subregions (e.g., region A (230), region B (240), region C (250)), each having an area smaller than the area of the haptic button zone (103) and where each detect a unique touch signals. The positions of the subregions (e.g., region A (230), region B (240), region C (250)) may define in relation to the x- and y-axes (210, 220). Similar to a touchpad with physical buttons, or similar to a computer mouse, one subregion (e.g., region A (230)) may be used to detect a "left" click (150) from a user, while another subregion (e.g., region C (250)) may be used to detect a "right" (150) from the user, where left and right clicks are transformed into different commands of the computer system. A third region (e.g., region B (240)) may be used to detect a different type of click (150) as configured by a user. Each subregion (e.g., region A (230), region B (240), region C (250)) may include its own touch sensor (106) and its own force sensor (104) in order to better distinguish clicks (150) in each of the subregions, alternative, the subregions (e.g., region A (230), region B (240), region C (250)) share a common touch sensor (106) and force sensor (104).

A computer system, as referenced herein, is intended to encompass any computing device such as a server, desktop computer, laptop computer, smart phone, personal data assistant (PDA), tablet computing device, one or more processors within these devices, or any other suitable processing device, including both physical or virtual instances (or both) of the computing device. The computer system can include one or more auxiliary devices, for example, to receive inputs and process or display outputs. Auxiliary devices can include a keypad, keyboard, touch screen, or other input device that can accept user information (e.g., joystick). Auxiliary devices can further include a computer screen or other output device that conveys information associated with the operation of the computer system, including digital data, visual, or audio information (or a combination of information), or a graphical user interface. Thus, in some instances, a computer system includes a touchpad.

A computer system includes one or more computer processors and data storage such as one or more of a non-persistent storage (e.g., volatile memory, such as random access memory (RAM), cache memory) and a persistent storage (e.g., a hard disk, an optical drive such as a compact disk (CD) drive or digital versatile disk (DVD) drive, a flash memory, etc.). The processor may be part or all of an integrated circuit for processing instructions. For example, the processor may be or include one or more cores or micro-cores. The computer system can further include a communication interface, which may include an integrated circuit for connecting to a network (e.g., a local area network (LAN), a wide area network (WAN) such as the Internet, mobile network, or any other type of network) and/or to another device.

In some embodiments, the processor (112) and data storage (114) of the touch controller (110) are the same as at least one processor and data storage of a computer system. Accordingly, in instances where the touchpad (102) of FIG. 1 is used in or with a computer system, the touch controller (110) may be encompassed, in terms of hardware and/or functionality, by the computer system.

Figure 3:
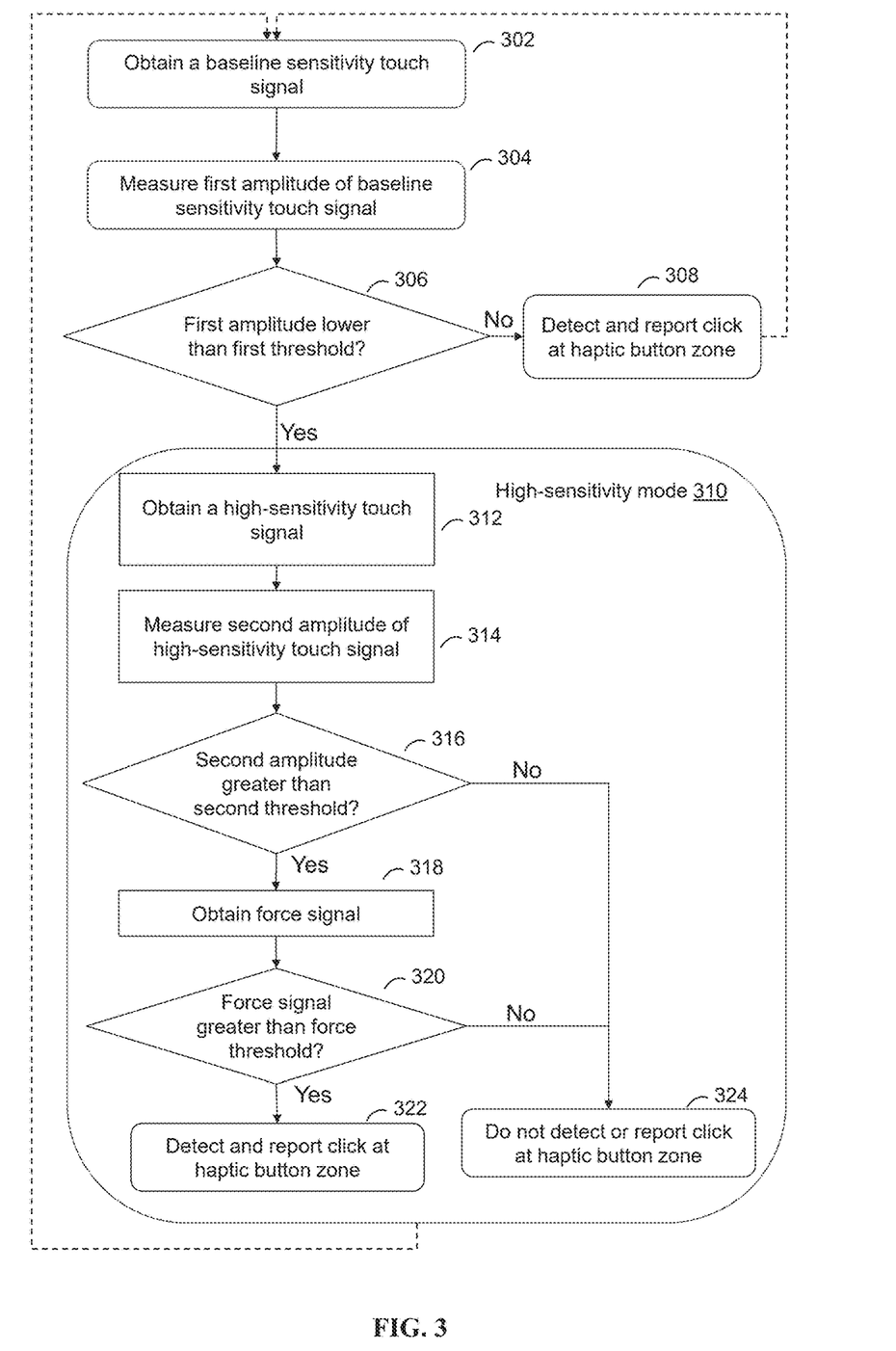
FIG. 3 depicts a flowchart in accordance with one or more embodiments of the disclosure.

FIG. 3 depicts a flowchart or a control sequence for using a touchpad in a high-sensitivity mode to detect a click from a weak touch signal. Such a scenario may include a user attempting to click a touchpad (102) with a capacitive touch sensor (106) utilizing a portion of their finger or an intermediary object that has low electrical conductivity. In embodiments where the touch sensor (106) is a capacitive touch sensor (106), the touch sensor (106) may not be able to measure a strong touch signal and therefore the click may be undetected. The blocks of FIG. 3 can be performed using the touch controller (110).

At Block 302, the touch sensor (106) is operating under the default conditions and a baseline sensitivity touch signal is obtained. Obtaining the baseline sensitivity touch signal may include scanning the haptic button zone (103) with a first scanning frequency. In Block 304, a first amplitude of the baseline sensitivity touch signal is measured. In general, an amplitude of a touch signal quantifies the strength or the magnitude of the touch signal (or change in the touch signal). In some instances, a signal-to-noise of the touch signal may also be measured by determining an uncertainty of the amplitude. For example, the touch signal may be measured over a period of time $\Delta t=t_1-t_0$ by measuring a series of individual amplitudes at time steps between $t_0$ and $t_1$ and to calculate an average of the individual amplitudes. The uncertainty of the average amplitude may be calculated by measuring the variance of the individual touch signal amplitudes. Alternatively, or in addition, the precision of the touch sensor (106) may be predetermined (e.g., with testing in a laboratory) such that the signal-to-noise of the touch signal can be estimated for a single amplitude. The signal-to-noise of the touch signal can be used to assist in detecting the click (150).

Under the default conditions, the amplitude of the baseline sensitivity touch signal is compared to a first amplitude threshold ("first threshold") in Block 306. If the first amplitude is not lower than the first threshold (i.e., if the first amplitude is greater than the first threshold) then a click is immediately detected in Block 308 and reported at the haptic button zone. Once a click is detected and reported at the haptic button zone, the process of detecting a click may be considered complete. The next time a user attempts a click on the touchpad (102), the process repeats, beginning with Block 302, as suggested by the dotted arrow pointing from Block 308 back to Block 302.

In embodiments utilizing a capacitive touch sensor (106), the first amplitude is a first change in capacitance measured by the touch sensor (106), and the first amplitude threshold specifies the magnitude of the first change in capacitance that must exceeded. Obtaining the baseline sensitivity touch signal, in this case, includes scanning the haptic button zone (103) with a first scanning frequency to measure the first change in capacitance. The process of moving from Block 306 to Block 308 may represent an ordinary use of the touchpad (102), where a user has applied sufficient signal to the touchpad (102) such that no further action is required to detect the click (150).

Embodiments of the present disclosure allow for detecting clicks (150) from the touchpad (102) even when the first amplitude of the baseline touch signal is lower than the first amplitude threshold. More specifically, a high-sensitivity mode (310) is activated in response to the first amplitude being lower than the first amplitude threshold, where the high-sensitivity mode includes steps to possibly identify a click (150) that otherwise may go undetected.

The high-sensitivity mode (310) includes the steps illustrated by Blocks 312-324. The high sensitivity mode (310) begins with Block 312, where a high-sensitivity touch signal is obtained. Obtaining the high-sensitivity touch signal includes scanning the haptic button zone (103) with a second scanning frequency. Generally, the scanning frequency does not change when the high-sensitivity mode (310) is activated, and the first scanning frequency and the second scanning frequency are substantially equal. However, in some alternative embodiments, the second scanning frequency may be greater than the first scanning frequency. Using a different scanning frequency during the high-sensitivity mode (310) compared to outside the high-sensitivity mode (310) may be advantageous to avoid noise interference, for example. An illustration comparing the first scanning frequency and the second scanning frequency in an alternative embodiment in which the second scanning frequency is greater than the first scanning frequency is provided in FIG. 4. As shown, FIG. 4 includes a horizontal axis representing touch signals (404) that are obtained and a vertical axis representing the frequency (402) with which the touch signals (404) are obtained. Touch signals $T_1$-$T_3$ are obtained by scanning the haptic button zone with a first scanning frequency ($f_1$) according to a baseline frequency touch scan (406). Accordingly, the touch signals $T_4$-$T_6$ are obtained by scanning the haptic button zone with a second scanning frequency ($f_2$) according to a high-frequency touch scan (408). Again, in this example, the second scanning frequency is greater than the first scanning frequency ($f_2$>$f_1$).

Figure 4:
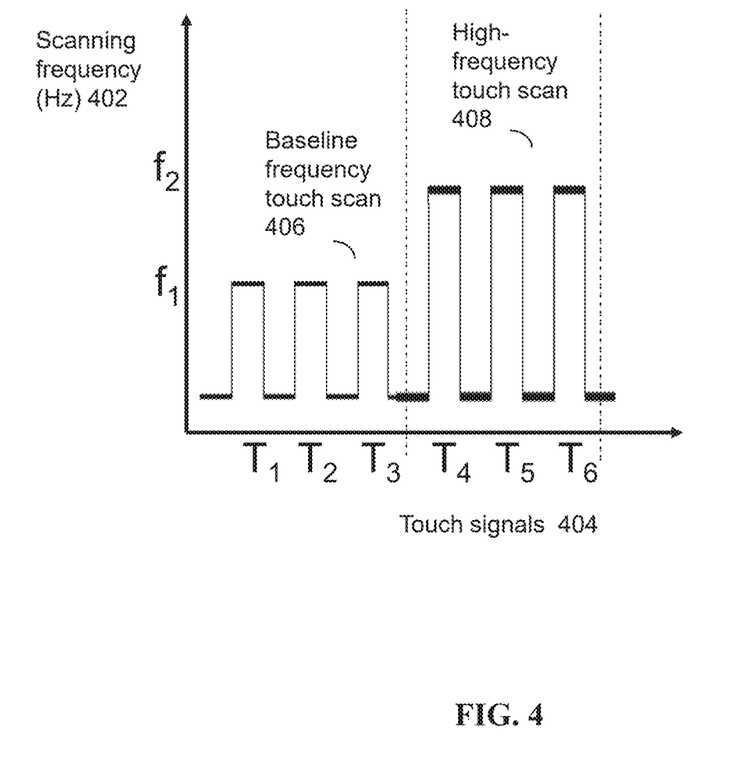
FIG. 4 depicts a baseline frequency touch scan on a touchpad and a high-frequency touch scan on a touchpad in accordance with one or more embodiments of the disclosure.

Utilizing a second scanning frequency that is greater than the first scanning frequency may be used to improve signal clarity for touch signals that are short in time. In addition, a greater scanning frequency provides more touch signals over the same amount of elapsed time, which may be advantageous for certain noise-filtering algorithms. However, it is emphasized that embodiments of the present disclosure are not limited to those that use a second scanning frequency that is greater than the first scanning frequency.

Returning to FIG. 3, an amplitude of the high sensitivity touch signal is measured in Block 314 after obtaining the high-sensitivity touch signal in Block 312. Similar to the baseline sensitivity touch signal obtained in Block 302, a signal-to-noise of the high-sensitivity touch signal may be measured by determining an uncertainty of the amplitude. In Block 316, the second amplitude is compared with a second amplitude threshold ("second threshold"). If the second amplitude is not greater than the second amplitude threshold, then a click is not detected or reported at the haptic button zone (103), as illustrated by Block 324. Such an event indicates that the touch signal is not significant enough to be detected as a click and may correspond to a user accidentally contacting the touch sensor.

Again, the high-sensitivity mode (310) is activated in response to the first amplitude being lower than the first amplitude threshold. Accordingly, the second amplitude threshold used in Block 316 is generally smaller than the first amplitude threshold used in Block 306. In embodiments utilizing a capacitive touch sensor (106), the first amplitude threshold may be a first change in capacitance while the second amplitude threshold is a second change in capacitance that is smaller than the first change in capacitance. Without using a smaller value for the second amplitude threshold compared to the first amplitude threshold, the comparison at Block 316 would likely result in failing to detect a click (Block 324) no differently than the comparison at Block 306.

In some embodiments, the first amplitude of the baseline sensitivity touch signal quantifies the signal-to-noise of the baseline sensitivity touch signal, and the second amplitude of the high-sensitivity touch signal quantifies the signal-to-noise of the high-sensitivity touch signal. In such cases, the first amplitude threshold and the second amplitude thresholds are thresholds in signal-to-noise.

Adjusting or defining the values of the first and second amplitude thresholds may be done at the software level using the touch controller (110), for example, by executing different commands stored in the data storage (114) using the processor (112). In some embodiments, adjusting or defining the values of the first and second amplitude thresholds may be done instead by adjusting the baseline capacitance (also called the parasitic capacitance, or the steady-state capacitance) of the touch sensor (106) during the high-sensitivity mode (310). In some instances, the first and second amplitude thresholds may be updated periodically. For example, the touch controller (110) may record, in the data storage (114), the frequency with which the high-sensitivity mode (310) is activated, or the average signal-to-noise levels of the baseline sensitivity touch signal. In response to determining that the high-sensitivity mode (310) is often used (e.g., for more than 50% of detected clicks), or in response to the signal-to-noise of the baseline sensitivity touch signal being consistently low, the first and second amplitude thresholds may be adjusted.

If the second amplitude is measured to be greater than the second threshold in Block 316, then the high-sensitivity mode (310) continues. In response to the second amplitude being greater than the second amplitude threshold, a force signal from the force sensor (104) disposed within the haptic button is obtained at Block 318. At Block 320, the force signal is compared to a force threshold. The force threshold may be predetermined and adjusted, similarly to the first and second amplitude thresholds, using either software commands or by adjusting the force sensor (104). In units of Newtons, the force threshold may be 0.5 Newtons or less, for example, 0.25 Newtons. In response to the force signal being greater than the force threshold, a click is detected and reported at the haptic button zone (103) as illustrated by Block 322. However, if the force signal is not greater than the force threshold, a click is not detected or reported at the haptic button zone (103), as illustrated by Block 324. On its own, the second amplitude threshold being smaller than the first amplitude may give rise spurious detections, or accidental clicks from the user being detected and reported. However, such spurious detections are limited by also requiring the force signal to be greater than the force threshold in order for a click to be detected and reported.

Blocks 322 and 324 mark the end of the high-sensitivity mode (310). Once one of these two steps is completed, the high-sensitivity mode ends. If a user attempts another click, the process begins again at Block 302, as suggested by the dashed lines pointing from the high-sensitivity mode (310) to Block 302. However, in some cases, or in some user-defined settings, the touchpad (102) may operate exclusively in the high-sensitivity mode. In such a case, the high-sensitivity mode is activated without obtaining the baseline sensitivity touch signal. Instead of returning to Block 302 after Block 322 (click detected) or Block 324 (click not detected) is reached, the steps of the high-sensitivity mode (310) would then repeat beginning with Block 312.

The control sequence illustrated by FIG. 3 includes the steps to detect one click from the touchpad (102). However, a user often seeks to click a touchpad (102) multiple times. Accordingly, the control sequence of FIG. 3 (beginning with Block 302, or beginning with Block 312 as described above in the case of exclusively using the high-sensitivity mode) may be repeated to detect additional clicks.

Figure 5:
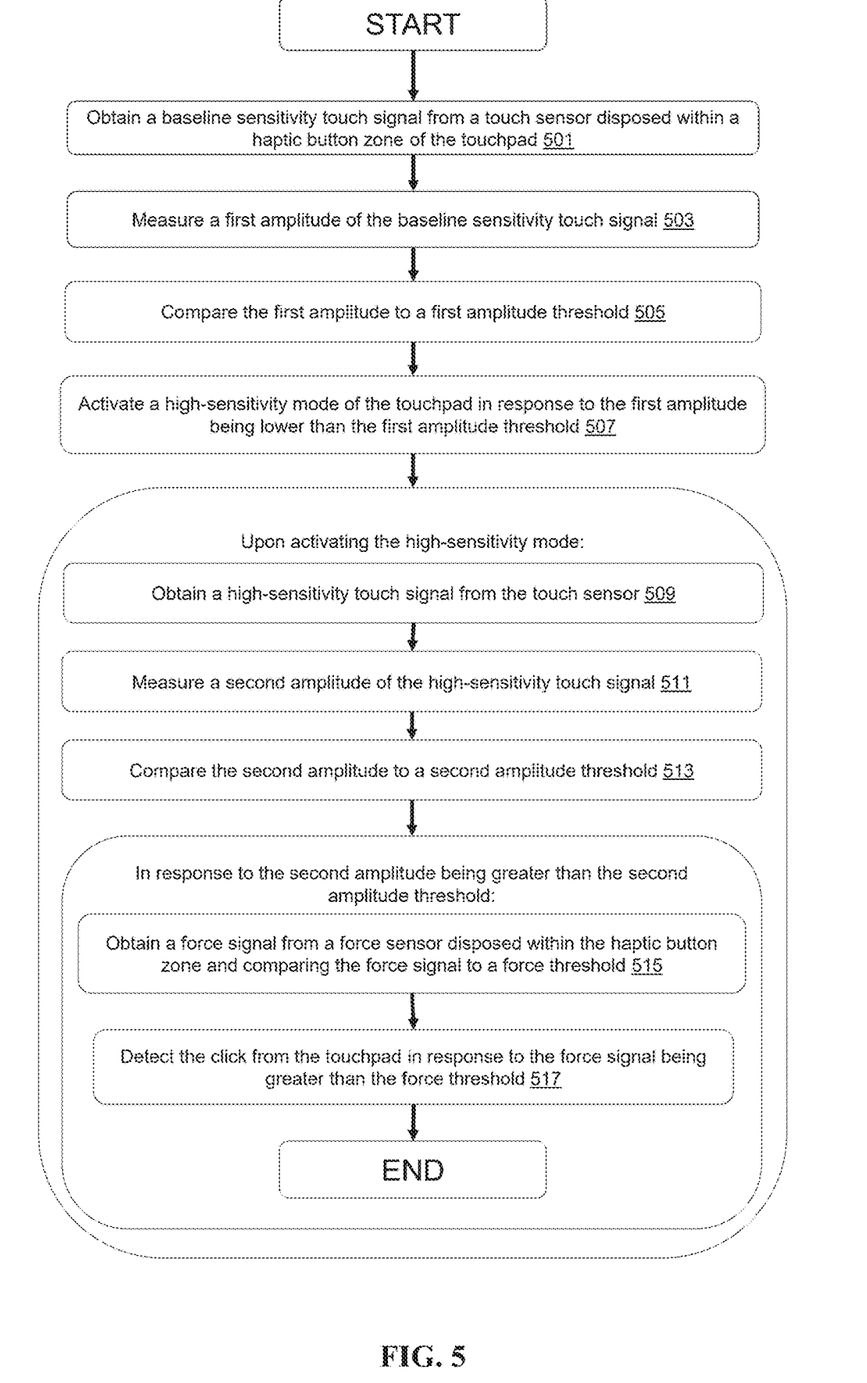
FIG. 5 depicts a method for detecting a click on a touchpad in accordance with one or more embodiments of the disclosure.

FIG. 5 depicts a method in accordance with one or more embodiments. The steps of the method of FIG. 5 can be performed using a touch controller (110) of a touchpad system (100) as previously described.

In Step 501, a baseline sensitivity touch signal is obtained from a touch sensor disposed within a haptic button zone of a touchpad (102). In Step 503, a first amplitude of the baseline sensitivity touch signal is measured. The amplitude characterizes the magnitude or strength of the touch signal. In Step 505, the first amplitude is compared to a first amplitude threshold. In Step 507, a high-sensitivity mode of the touchpad (102) is activated in response to the first amplitude being lower than the first amplitude threshold. Such a scenario may correspond to a user attempting a click but the touch system failing to detect a click due to technical reasons (e.g., not applying contact to the haptic button zone for a long enough period of time), prompting the high-sensitivity mode to activate. The following steps (Step 509-517) are executed as part of the high-sensitivity mode. Upon activating the high-sensitivity mode, Step 509 is performed, during which a high-sensitivity touch signal is obtained from the touch sensor.

Continuing with FIG. 5, at Step 511, a second amplitude of the high-sensitivity touch signal is measured. Again, the second amplitude of the high-sensitivity touch signal characterizes its strength or magnitude. At Step 513, the second amplitude is compared to a second amplitude threshold. The second amplitude threshold may be smaller than the first amplitude threshold. However, in some embodiments, the second amplitude threshold is equal to or greater than the first amplitude threshold. In embodiments where the second amplitude threshold is equal to or greater than the first amplitude threshold, a greater scanning frequency may be used to scan the haptic button zone to detect signals with significant amplitudes but that are only present for a short period of time.

The touch sensor may be a capacitive touch sensor. In such embodiments, the baseline sensitivity touch signal is a first change in capacitance and the first amplitude of the baseline sensitivity touch signal quantifies its magnitude. Similarly, the high-sensitivity touch signal is a second change in capacitance and the second amplitude of the high-sensitivity touch signal quantifies its magnitude. The same applies to the first amplitude threshold and the second amplitude threshold. In some embodiments, the first and second amplitudes each quantify a signal-to-noise of the respective touch signals. In such cases, the first amplitude threshold and the second amplitude instead quantify different signal-to-noise ratios that the amplitudes are compared to.

Continuing with FIG. 5, Steps 515 and 517 are performed in response to the second amplitude being greater than the second amplitude threshold. At Step 515, a force signal is obtained from a force sensor disposed within the haptic button zone, and the force signal is compared to a force threshold. In response to the force being greater than the force threshold, the click is detected from the touchpad. By requiring that both the second amplitude is greater than the second amplitude threshold and that the force signal is greater than the force threshold, the touchpad may operate with a high scanning frequency and with a low second amplitude threshold without introducing spurious detections.

The method of FIG. 5 can be executed repeatedly (e.g., in a loop) to determine contact position(s) in real time. In addition, the high-sensitivity mode may be activated without obtaining the baseline sensitivity touch signal. In such a case, the touchpad may continuously operate in the high-sensitivity mode, beginning with obtaining the high-sensitivity touch signal from the touch sensor in Step 509.

Embodiments of the disclosure have one or more of the following advantages. Embodiments of the disclosure may provide real-time and highly accurate click detections utilizing touch sensor within a touchpad that operates at high sensitivities. The detection of a click is based on a process that generally involves obtaining a touch signal with a baseline sensitivity, i.e., under ordinary operating conditions. However, a user may attempt a click that is not detected at the baseline sensitivity. To address this shortcoming, a high-sensitivity mode is activated in response to the amplitude of the baseline sensitivity touch signal being lower than a predetermined first amplitude threshold. In the high-sensitivity mode, a second touch signal is obtained, referred to as a high-sensitivity touch signal, and compared to a second amplitude threshold. The high-sensitivity touch signal may be obtained with a high scanning frequency relative to the baseline sensitivity touch signal, or it may be obtained after altering the baseline (parasitic or steady-state) capacitance of the touch sensor to be more sensitive. Alternatively, or in addition, the high-sensitivity touch signal may be obtained under the same conditions as the baseline sensitivity touch signal, but the former is considered "highly sensitive" because the second amplitude threshold is smaller than the first amplitude threshold, thereby enabling detection of weaker amplitudes. Without further action, the aforementioned steps may result in spurious or accidental click detections. Therefore, a force signal is also obtained from a force sensor, and in order for the click to be detected, the force signal must be greater than the force threshold. Consequently, the touchpad may operate safely with high-sensitivities without introducing spurious detections.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method for detecting a click on a touchpad, the method comprising:
  obtaining a baseline sensitivity touch signal from a touch sensor disposed within a haptic button zone of the touchpad;
  measuring a first amplitude of the baseline sensitivity touch signal;
  comparing the first amplitude to a first amplitude threshold;
  activating a high-sensitivity mode of the touchpad in response to the first amplitude being lower than the first amplitude threshold; and
  upon activating the high-sensitivity mode:
    obtaining a high-sensitivity touch signal from the touch sensor, measuring a second amplitude of the high-sensitivity touch signal, comparing the second amplitude to a second amplitude threshold, and in response to the second amplitude being greater than the second amplitude threshold:

obtaining a force signal from a force sensor disposed within the haptic button zone and comparing the force signal to a force threshold, and detecting the click from the touchpad in response to the force signal being greater than the force threshold.

2. The method according to claim 1, wherein the touch sensor is a capacitive sensor, the baseline sensitivity touch signal is a first change in capacitance, and the high-sensitivity touch signal is a second change in capacitance.

3. The method according to claim 2, wherein:

obtaining the baseline sensitivity touch signal comprises scanning the haptic button zone with a first scanning frequency to measure the first change in capacitance; and obtaining the high-sensitivity touch signal comprises scanning the haptic button zone with a second scanning frequency to measure the second change in capacitance.

4. The method according to claim 1, wherein the second amplitude threshold is lower than the first amplitude threshold.

5. The method according to claim 1, wherein the haptic button zone comprises an area of the touchpad smaller than a total area of the touchpad.

6. The method according to claim 1, wherein the high-sensitivity mode is activated without obtaining the baseline sensitivity touch signal.

7. The method according to claim 1, wherein upon activating the high-sensitivity mode the method further comprises:

transmitting the click to a computer system, and executing a command with the computer system based on the transmitted click.

8. A touchpad system, comprising:

a touchpad comprising a haptic button zone;

a touch sensor disposed within the haptic button zone;

a force sensor disposed within the haptic button zone; and a touch controller in electrical communication with the touchpad and configured to:

obtain a baseline sensitivity touch signal from the touch sensor, measure a first amplitude of the baseline sensitivity touch signal, compare the first amplitude to a first amplitude threshold, activate a high-sensitivity mode of the touchpad in response to the first amplitude being lower than the first amplitude threshold, and upon activating the high-sensitivity mode:

obtain a high-sensitivity touch signal from the touch sensor;

measure a second amplitude of the high-sensitivity touch signal;

compare the second amplitude to a second amplitude threshold; and in response to the second amplitude being greater than the second amplitude threshold:

obtain a force signal from the force sensor and compare the force signal to a force threshold, and detect a click from the touchpad in response to the force signal being greater than the force threshold.

9. The touchpad system according to claim 8, wherein the touch sensor is a capacitive sensor, the baseline sensitivity touch signal is a first change in capacitance, and the high-sensitivity touch signal is a second change in capacitance.

10. The touchpad system according to claim 9, wherein:

obtaining the baseline sensitivity touch signal comprises scanning the haptic button zone with a first scanning frequency to measure the first change in capacitance; and obtaining the high-sensitivity touch signal comprises scanning the haptic button zone with a second scanning frequency to measure the second change in capacitance.

11. The touchpad system according to claim 8, wherein the second amplitude threshold is lower than the first amplitude threshold.

12. The touchpad system according to claim 8, wherein the haptic button zone comprises an area of the touchpad smaller than a total area of the touchpad.

13. The touchpad system according to claim 8, wherein the high-sensitivity mode is activated without obtaining the baseline sensitivity touch signal.

14. The touchpad system according to claim 8, wherein upon activating the high-sensitivity mode, the system is further configured to:

transmit the click to a computer system, and execute a command with the computer system based on the transmitted click.

\* \* \* \* \*